US010526440B2

United States Patent
Zook et al.

(10) Patent No.: US 10,526,440 B2
(45) Date of Patent: Jan. 7, 2020

(54) METHOD OF MAKING A POLYMER NETWORK FROM A POLYTHIOL AND A POLYEPOXIDE

(71) Applicant: 3M INNOVATIVE PROPERTIES COMPANY, St. Paul, MN (US)

(72) Inventors: Jonathan D. Zook, Stillwater, MN (US); Susan E. DeMoss, Stillwater, MN (US); Sheng Ye, Woodbury, MN (US); Andrew R. Davis, Catonsville, MD (US); Tao Gong, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 11 days.

(21) Appl. No.: 15/565,952

(22) PCT Filed: Apr. 29, 2016

(86) PCT No.: PCT/US2016/029982
§ 371 (c)(1),
(2) Date: Oct. 12, 2017

(87) PCT Pub. No.: WO2016/176537
PCT Pub. Date: Nov. 3, 2016

(65) Prior Publication Data
US 2018/0094097 A1     Apr. 5, 2018

Related U.S. Application Data

(60) Provisional application No. 62/154,502, filed on Apr. 29, 2015, provisional application No. 62/154,469, filed on Apr. 29, 2015.

(51) Int. Cl.
| | | |
|---|---|---|
| C08G 59/22 | (2006.01) | |
| C08G 59/40 | (2006.01) | |
| C08G 59/66 | (2006.01) | |
| C08G 59/32 | (2006.01) | |
| C08G 59/56 | (2006.01) | |
| C08G 59/68 | (2006.01) | |
| C08G 75/02 | (2016.01) | |
| C08G 75/04 | (2016.01) | |
| C08L 81/02 | (2006.01) | |
| C08L 63/00 | (2006.01) | |
| C08L 81/04 | (2006.01) | |

(52) U.S. Cl.
CPC ......... *C08G 59/4021* (2013.01); *C08G 59/22* (2013.01); *C08G 59/32* (2013.01); *C08G 59/56* (2013.01); *C08G 59/66* (2013.01); *C08G 59/686* (2013.01); *C08G 75/02* (2013.01); *C08G 75/04* (2013.01); *C08L 63/00* (2013.01); *C08L 81/02* (2013.01); *C08L 81/04* (2013.01)

(58) Field of Classification Search
CPC .............................. C08G 59/686; C08G 59/66
See application file for complete search history.

(56) References Cited

U.S. PATENT DOCUMENTS

| | | | |
|---|---|---|---|
| 2,466,963 | A | 4/1949 | Patrick |
| 2,789,958 | A | 4/1957 | Fettes |
| 4,165,425 | A | 8/1979 | Bertozzi |
| 4,366,307 | A | 12/1982 | Singh |
| 4,609,762 | A | 9/1986 | Morris |
| 5,225,472 | A | 7/1993 | Cameron |
| 5,610,243 | A | 3/1997 | Vietti |
| 5,912,319 | A | 6/1999 | Zook |
| 5,959,071 | A | 9/1999 | DeMoss |
| 6,057,380 | A | 5/2000 | Birbaum |
| 6,087,070 | A | 7/2000 | Turner |
| 6,124,371 | A | 9/2000 | Stanssens |
| 6,172,179 | B1 | 1/2001 | Zook |
| 6,410,628 | B1 | 6/2002 | Hall-Goulle |
| 6,509,418 | B1 | 1/2003 | Zook |
| 7,538,104 | B2 | 5/2009 | Baudin |
| 9,637,666 | B2 * | 5/2017 | Kitano ................. C09J 163/04 |
| 9,714,317 | B2 | 7/2017 | Li |
| 2004/0158023 | A1 | 8/2004 | Hwang |
| 2004/0242867 | A1 * | 12/2004 | Baudin ................ C07D 487/04 540/594 |
| 2007/0202341 | A1 * | 8/2007 | Dogan ................... B05D 1/36 428/423.1 |

(Continued)

FOREIGN PATENT DOCUMENTS

| | | |
|---|---|---|
| JP | S59-129221 | 7/1984 |
| JP | 2009-126974 | 6/2009 |

(Continued)

OTHER PUBLICATIONS

Machine Translation of JP2009126974 (Year: 2019).*

(Continued)

*Primary Examiner* — Michael M Dollinger
(74) *Attorney, Agent, or Firm* — 3M IPC; Carlos M. Téllez

(57) ABSTRACT

A method of making a polymer network. The method includes providing a composition including a polythiol having more than one thiol group and a polyepoxide having more than one epoxide group, applying a solution including a photolatent base catalyst to a surface of the composition, and subsequently exposing the composition to light. Upon exposure to light, the photolatent base catalyst photochemically generates a first amine and at least partially cures at least the surface of the composition to form the polymer network.

20 Claims, No Drawings

(56) References Cited

U.S. PATENT DOCUMENTS

| | | | | |
|---|---|---|---|---|
| 2007/0249484 | A1* | 10/2007 | Benkhoff | B01J 31/0205 502/5 |
| 2011/0190412 | A1 | 8/2011 | Studer | |
| 2016/0355645 | A1* | 12/2016 | Martin | C08G 59/66 |
| 2018/0030322 | A1 | 2/2018 | Bons | |

FOREIGN PATENT DOCUMENTS

| | | |
|---|---|---|
| JP | 2010-095686 | 4/2010 |
| JP | 2013-087149 | 5/2013 |
| JP | 2014-133875 | 7/2014 |
| JP | 2014-141419 | 8/2014 |
| WO | WO 2005-123862 | 12/2005 |
| WO | WO 2006/008251 | 1/2006 |
| WO | WO 2007-068683 | 6/2007 |
| WO | WO 2009/069562 | 6/2009 |
| WO | WO 2013-151893 | 10/2013 |
| WO | WO 2014-164103 | 10/2014 |
| WO | WO 2014-164244 | 10/2014 |
| WO | WO 2014-172305 | 10/2014 |
| WO | WO 2015-102967 | 7/2015 |
| WO | WO 2015-121341 | 8/2015 |
| WO | WO 2016-106352 | 6/2016 |
| WO | WO 2016-176548 | 11/2016 |
| WO | WO 2018/227149 | 12/2018 |

OTHER PUBLICATIONS

Blickenstorfer, "Adhesive curing on demand" Paint & Coatings Industry Publication, Nov. 2009, [retrieved from the internet on Dec. 13, 2017], URL <https://www.pcimag.com/articles/89792-adhesive-curing-on-demand?>, pp. 8.

Kiniro, "Aminimides Derived From p-Substituted Benzoylformic Acid Ester as Thermal/Photolatent Bases and Photoradical Initiators", Journal of Polymer Science, Part A: Polymer Chemistry, Jul. 2013, vol. 51, pp. 4292-4300.

Salmi, "Quaternary Ammonium Salts of Phenylglyoxylic Acid as Photobase Generators for Thiol-Promoted Epoxide Photopolymerization", Polymer Chemistry, Jul. 2014, vol. 5, pp. 6577-6583.

Sangermano, "Photolatent Amines Producing a Strong Base as Photocatalyst for the in-situ Preparation of Organic-Inorganic Hybrid Coatings", Polymer, Apr. 2014, vol. 55, No. 7, pp. 1628-1635.

Suyama, "Photobase Generators: Recent Progress and Application Trend in Polymer Systems", Progress in Polymer Science, 2009, vol. 34, pp. 194-209.

International Search Report for PCT International Application No. PCT/US2016/029982, dated Jul. 15, 2016, 5 pages.

International Search Report for PCT International Application No. PCT/US2016/030021, dated Jul. 15, 2016, 4 pages.

* cited by examiner

METHOD OF MAKING A POLYMER NETWORK FROM A POLYTHIOL AND A POLYEPOXIDE

CROSS-REFERENCE TO RELATED APPLICATIONS

This application claims priority to U.S. Provisional Application Nos. 62/154,502 and 62/154,469, filed Apr. 29, 2015, the disclosures of which are incorporated by reference in their entirety herein.

BACKGROUND

Sulfur-containing polymers are known to be well-suited for use in aerospace sealants due to their fuel resistant nature upon crosslinking. Such crosslinking can be carried out, for example, by reaction of a thiol-terminated sulfur-containing compound with an epoxy resin, generally in the presence of an amine accelerator as described in U.S. Pat. No. 5,912,319 (Zook et al.). A desirable combination of properties for aerospace sealants, which is difficult to obtain, is the combination of long application time (i.e., the time during which the sealant remains usable) and short curing time (the time required to reach a predetermined strength).

In other technologies, photochemical generation of bases may be useful for a variety of polymerization reactions. For example, photochemically generated bases may be useful for catalyzing epoxide homopolymerization, Michael additions, and thiol- or polyol-isocyanate reactions. Japanese Patent Application Publication JP2009-126974 describes a thiol-epoxide reaction catalyzed by a photogenerated base.

SUMMARY

The method according to the present disclose includes providing a composition comprising a polythiol comprising more than one thiol group and a polyepoxide comprising more than one epoxide group. A solution including a photolatent base catalyst is then applied to the surface of the composition. Following the application of the solution including the photolatent base to the surface of the composition, at least a non-tacky skin can be made on the surface by exposing the applied photolatent base to an appropriate light source. Thus, the method can be useful, for example, for providing a traditional one-part or two-part sealant composition with a cure-on-demand feature to provide at least a protective skin on the surface of sealant composition.

In one aspect, the present disclosure provides a method of making a polymer network. The method includes providing a composition including a polythiol having more than one thiol group and a polyepoxide having more than one epoxide group, applying a solution including a photolatent base catalyst to a surface of the composition, and subsequently exposing the composition to light. Upon exposure to light, the photolatent base catalyst photochemically generates a first amine and at least partially cures at least the surface of the composition to form the polymer network.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility, but may be swellable in the presence of an appropriate solvent.

The term "polymer or polymeric" will be understood to include polymers, copolymers (e.g., polymers formed using two or more different monomers), oligomers or monomers that can form polymers, and combinations thereof, as well as polymers, oligomers, monomers, or copolymers that can be blended.

"Alkyl group" and the prefix "alk-" are inclusive of both straight chain and branched chain groups and of cyclic groups. In some embodiments, alkyl groups have up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms. Terminal "alkenyl" groups have at least 3 carbon atoms.

"Alkylene" is the multivalent (e.g., divalent or trivalent) form of the "alkyl" groups defined above.

"Arylalkylene" refers to an "alkylene" moiety to which an aryl group is attached. "Alkylarylene" refers to an "arylene" moiety to which an alkyl group is attached.

The terms "aryl" and "arylene" as used herein include carbocyclic aromatic rings or ring systems, for example, having 1, 2, or 3 rings and optionally containing at least one heteroatom (e.g., O, S, or N) in the ring optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

All numerical ranges are inclusive of their endpoints and non-integral values between the endpoints unless otherwise stated.

DETAILED DESCRIPTION

Existing sealant products now in use in the aircraft industry are typically either two-part products or one-part products. For the two-part products, once the user mixes the two parts, the reaction begins and the sealant starts to form into an elastomeric solid. After mixing, the time that the sealant remains usable is called the application life or open time. Throughout the application life, viscosity of the sealant gradually increases until the sealant is too viscous to be applied. Application life and cure time are typically related in that short-application-life products cure quickly. Conversely, long-application-life products cure slowly. In practice, customers chose products with differing application lives and cure times depending on the specific application. This requires the customer to maintain inventories of multiple products to address the production flow requirements of building and repairing aircraft. For one-part products, users can avoid a complicated mixing step, but the product has to be shipped and stored in a freezer before application. Advantageously, in many embodiments, the method according to the present disclosure can be useful for adding a cure-on-demand feature to a one-part sealants having a long application life.

The method according to the present disclose includes providing a composition comprising a polythiol comprising more than one thiol group and a polyepoxide comprising more than one epoxide group. The composition may be stored as a one-part composition (e.g., frozen if necessary) or stored as a two-part composition and mixed shortly before use. The composition may, in some embodiments, be applied to a substrate to be coated or sealed, for example, leaving a surface of the composition exposed. A solution comprising the photolatent base catalyst is then applied to the surface of the composition. The solution comprising the photolatent base can be applied by any convenient method, for example, dip coating, knife coating, reverse roll coating, brushing, and spraying (e.g., aerosol spraying or electrostatic spraying). The solution may be allowed to penetrate into the composition for any desired length of time to allow the photolatent base to combine with the polythiol and polyepoxide. In some embodiments, the solution further comprises a photosensitizer. Following the application of the solution comprising the photolatent base to the surface of the composition, at least a non-tacky skin can be made on the surface by exposing the applied photolatent base to an appropriate light source. The length of time that the solution is allowed to penetrate the composition can influence the depth of the light cure and thickness of the cured skin at the surface of the composition.

The solution including the photolatent base and optionally the photosensitizer can include any suitable solvent or solvents capable of dissolving these components. The components may be present in the solvent at any suitable concentration, (e.g., from about 5 percent to about 90 percent by weight based on the total weight of the solution). In some embodiments, each component may be present in a range from 10 to 85 or 25 to 75 percent by weight, based on the total weight of the solution. Illustrative examples of suitable solvents include aliphatic and alicyclic hydrocarbons (e.g., hexane, heptane, and cyclohexane), aromatic solvents (e.g., benzene, toluene, and xylene), ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone, and methyl isobutyl ketone), sulfoxides (e.g., dimethyl sulfoxide), amides (e.g., N,N-dimethylformamide and N,N-dimethylacetamide), halogenated solvents (e.g., methylchloroform, 1,1,2-trichloro-1,2,2-trifluoroethane, trichloroethylene, and trifluorotoluene), and mixtures thereof. When an aromatic photosensitizer is present, an aromatic solvent may be useful.

Exposing the composition to light photochemically generates a first amine that at least partially cures at least the surface of the composition. Depending on various factors, exposure to light might be sufficient to cure the composition to the desired non-tackiness and hardness and to the desired depth. In these cases, the composition may be considered to be fully cured. Compositions that are sufficiently thin, have no filler or only light-colored filler, and that are not shielded from the light source may be cured to the desired non-tackiness and hardness simply by exposing the composition to light after applying the solution of the photolatent base catalyst to the surface of the composition. In some embodiments, at least the surface of the composition is cured to an extent that the surface becomes non-tacky. A non-tacky surface may be one in which the surface no longer tightly adheres to L-LP-690 standard low density polyethylene film. Such a non-tacky surface may be achieved after exposure of the composition disclosed herein to a light source for up to 10 minutes, up to 5 minutes, up to 3 minutes, up to 2 minutes, or, in some cases, up to 1 minute or up to 30 seconds.

However, the thickness of the composition, the presence and nature of filler, the existence and size of areas shielded from light, and other factors may prevent the curing of the composition to the desired non-tackiness and hardness or to the desired depth. In these embodiments, before applying the solution comprising the photolatent base, the composition that includes the polythiol and the polyepoxide can include a second amine, that is the same or different from the first amine. In some of these embodiments, the method of making a polymer network includes allowing the composition to achieve a temperature sufficient for the second amine to at least partially cure the composition. In some embodiments, the temperature sufficient for the second amine to at least partially cure the composition is ambient temperature (that is, no external heat source is necessary). In these embodiments, the second amine can serve as a useful back-up cure mechanism for the composition.

The method according to the present disclosure can also be useful, for example, for adding a second curing mechanism to an existing product. For example, a traditional one-part or two-part sealant can include a polythiol, a polyepoxide, and an amine or other accelerator. The accelerator may be present to provide the sealant composition with a balance of a desirable open time and cure time. For example, the composition may be designed to have at least one of a non-tacky surface or a 30 Shore "A" hardness in less than 24 hours, in some embodiments, less than 12 hours or 10 hours under ambient conditions. The compositions may be designed achieve a 45 to 50 Shore "A" hardness in up to 2 weeks, up to 1 week, up to 5 days, up to 3 days, or up to 1 day. The solution described herein can be sprayed on the exposed surface of the sealant composition, which can then be exposed to light to provide at least a protective, non-tacky skin on the surface of the composition. Underneath the protective skin, the composition can continue to cure by means of its accelerator.

Polythiols and polyepoxides useful for practicing the present disclosure have more than one thiol group and epoxide group, respectively. In some embodiments, the polythiol includes at least two thiol groups, and the polyepoxide includes at least two epoxide groups. Generally, in order to achieve chemical crosslinking between polymer chains, greater than two thiol groups and/or greater than two epoxide groups are present in at least some of the polythiol and polyepoxide molecules, respectively. When using a polythiol having two thiol groups, for example, a mixture of polyepoxides may be useful in which at least one polyepoxide has two epoxide groups, and at least one polyepoxide has at least three epoxide groups. Mixtures of polyepoxides and/or polythiols having at least 5 percent functional equivalents of epoxide groups contributed by polyepoxides having at least three epoxide groups or at least 5 percent functional equivalents of thiol groups contributed by polythiols having at least three thiol groups may be useful.

A variety of polythiols having more than one thiol group and polyepoxides having more than one epoxide group are useful in the method according to the present disclosure. In some embodiments, the polythiol is monomeric. In these embodiments, the polythiol may be an alkylene, arylene, alkylarylene, arylalkylene, or alkylenearylalkylene having at least two mercaptan groups, wherein any of the alkylene, alkylarylene, arylalkylene, or alkylenearylalkylene are optionally interrupted by one or more ether (i.e., —O—), thioether (i.e., —S—), or amine (i.e., —NR$^1$—) groups and optionally substituted by alkoxy or hydroxyl. Useful monomeric polythiols may be dithiols or polythiols with more than 2 (in some embodiments, 3 or 4) mercaptan groups. In some embodiments, the polythiol is an alkylene dithiol in which the alkylene is optionally interrupted by one or more ether (i.e., —O—) or thioether (i.e., —S—) groups. Examples of useful dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane and mixtures thereof. Examples of polythiols having more than two mercaptan groups include propane-1,2,3-trithiol; 1,2-bis[(2-mercaptoethyl)thio]-3-mercaptopropane; tetrakis(7-mercapto-2,5-dithiaheptyl)methane; and trithiocyanuric acid. Combinations of any of these or with any of the dithiols mentioned above may be useful.

In some embodiments, the polythiol in the method according to the present disclosure is oligomeric or polymeric. Examples of useful oligomeric or polymeric polythiols include polythioethers and polysulfides. Polythioethers include thioether linkages (i.e., —S—) in their backbone structures. Polysulfides include disulfide linkages (i.e., —S—S—) in their backbone structures.

Polythioethers can be prepared, for example, by reacting dithiols with dienes, diynes, divinyl ethers, diallyl ethers, ene-ynes, or combinations of these under free-radical conditions. Useful dithiols include any of the dithiols listed above. Examples of suitable divinyl ethers include divinyl ether, ethylene glycol divinyl ether, butanediol divinyl ether, hexanediol divinyl ether, diethylene glycol divinyl ether, triethylene glycol divinyl ether, tetraethylene glycol divinyl ether, cyclohexanedimethanol divinyl ether, polytetrahydrofuryl divinyl ether, and combinations of any of these. Useful divinyl ethers of formula $CH_2$=CH—O—(—$R^2$—O—)$_m$—CH=$CH_2$, in which m is a number from 0 to 10, $R^2$ is $C_2$ to $C_6$ branched alkylene can be prepared by reacting a polyhydroxy compound with acetylene. Examples of compounds of this type include compounds in which $R^2$ is an alkyl-substituted methylene group such as —CH($CH_3$)— (e.g., those obtained from BASF, Florham Park, N.J., under the trade designation "PLURIOL", for which $R^2$ is ethylene and m is 3.8) or an alkyl-substituted ethylene (e.g., —$CH_2$CH($CH_3$)— such as those obtained from International Specialty Products of Wayne, N.J., under the trade designation "DPE" (e.g., "DPE-2" and "DPE-3"). Examples of other suitable dienes, diynes, and diallyl ethers include 4-vinyl-1-cyclohexene, 1,5-cyclooctadiene, 1,6-heptadiyne, 1,7-octadiyne, and diallyl phthalate. Small amounts trifunctional compounds (e.g., triallyl-1,3,5-triazine-2,4,6-trione, 2,4,6-triallyloxy-1,3,5-triazine) may also be useful in the preparation of oligomers.

Examples of oligomeric or polymeric polythioethers useful for practicing the present disclosure are described, for example, in U.S. Pat. No. 4,366,307 (Singh et al.), U.S. Pat. No. 4,609,762 (Morris et al.), U.S. Pat. No. 5,225,472 (Cameron et al.), U.S. Pat. No. 5,912,319 (Zook et al.), U.S. Pat. No. 5,959,071 (DeMoss et al.), U.S. Pat. No. 6,172,179 (Zook et al.), and U.S. Pat. No. 6,509,418 (Zook et al.). In some embodiments, the polyether is represented by formula HS—$R^3$—[S—($CH_2$)$_2$—O—[—$R^4$—O—]$_m$—($CH_2$)$_2$—S—$R^3$—]$_n$—SH, wherein each $R^3$ and $R^4$ is independently a $C_{2-6}$ alkylene, wherein alkylene may be straight-chain or branched, $C_{6-8}$ cycloalkylene, $C_{6-10}$ alkylcycloalkylene, —[($CH_2$)$_p$—X—]$_q$—(—$CH_2$—)$_r$, in which at least one —$CH_2$— is optionally substituted with a methyl group, X is one selected from the group consisting of O, S and —NR$^5$—, $R^5$ denotes hydrogen or methyl, m is a number from 0 to 10, n is a number from 1 to 60, p is an integer from 2 to 6, q is an integer from 1 to 5, and r is an integer from 2 to 10. Polythioethers with more than two mercaptan groups may also be useful.

In some embodiments, a free-radical initiator is combined with the dithiols with dienes, diynes, divinyl ethers, diallyl ethers, ene-ynes, or combinations of these, and the resulting mixture is heated to provide the polythioethers. Examples of suitable free-radical initiators include azo compounds (e.g., 2,2'-azobisisobutyronitrile (AIBN), 2,2'-azobis(2-methylbutyronitrile), or azo-2-cyanovaleric acid). In some embodiments, the free-radical initiator is an organic peroxide. Examples of useful organic peroxides include hydroperoxides (e.g., cumene, tert-butyl or tert-amyl hydroperoxide), dialkyl peroxides (e.g., di-tert-butylperoxide, dicumylperoxide, or cyclohexyl peroxide), peroxyesters (e.g., tert-butyl perbenzoate, tert-butyl peroxy-2-ethylhexanoate, tert-butyl peroxy-3,5,5-trimethylhexanoate, tert-butyl monoperoxymaleate, or di-tert-butyl peroxyphthalate), peroxycarbonates (e.g., tert-butylperoxy 2-ethylhexylcarbonate, tert-butylperoxy isopropyl carbonate, or di(4-tert-butylcyclohexyl) peroxydicarbonate), ketone peroxides (e.g., methyl ethyl ketone peroxide, 1,1-di(tert-butylperoxy)cyclohexane, 1,1-di(tert-butylperoxy)-3,3,5-trimethylcyclohexane, and cyclohexanone peroxide), and diacylperoxides (e.g., benzoyl peroxide or lauryl peroxide). The organic peroxide may be selected, for example, based on the temperature desired for use of the organic peroxide and compatibility with the monomers. Combinations of two or more organic peroxides may also be useful.

The free-radical initiator useful for making a polythioether may also be a photoinitiator. Examples of useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); 1-hydroxycyclohexyl phenyl ketone; and acylphosphine oxide derivatives and acylphosphonate derivatives (e.g., bis(2,4,6-trimethylbenzoyl)phenylphosphine oxide, diphenyl-2,4,6-trimethylbenzoylphosphine oxide, isopropoxyphenyl-2,4,6-trimethylbenzoylphosphine oxide, or dimethyl pivaloylphosphonate). Many photoinitiators are available, for example, from BASF under the trade designation "IRGACURE". The photoinitiator may be selected, for example, based on the desired wavelength for curing and compatibility with the monomers. When using a photoinitiator, the polythioether is typically prepared using an actinic light source (e.g., at least one of a blue light source or a UV light source).

Polythioethers can also be prepared, for example, by reacting dithiols with diepoxides, which may be carried out by stirring at room temperature, optionally in the presence of a tertiary amine catalyst (e.g., 1,4-diazabicyclo[2.2.2]octane (DABCO)). Useful dithiols include any of those described above. Useful epoxides can be any of those having two epoxide groups. In some embodiments, the diepoxide is a bisphenol diglycidyl ether, wherein the bisphenol (i.e., —O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. Polythioethers prepared from dithiols and diepoxides have pendent hydroxyl groups and can have structural repeating units represented by formula —S—$R^3$—S—$CH_2$—CH(OH)—$CH_2$—O—$C_6H_5$—$CH_2$—$C_6H_5$—O—$CH_2$—CH(OH)—$CH_2$—S—$R^3$—S—, wherein $R^3$ is as defined above, and the bisphenol (i.e., —O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. Mercaptan terminated polythioethers of this type can also be reacted with any of the dienes, diynes, divinyl ethers, diallyl ethers, and ene-ynes listed above under free radical conditions. Any of the free-radical initiators and methods described above may be useful for preparing the polythioethers. In some embodiments, the thermal initiators described above are used, and the resulting mixture is heated to provide the polythioethers.

Polysulfides are typically prepared by the condensation of sodium polysulfide with bis-(2-chloroethyl) formal, which provides linear polysulfides having two terminal mercaptan groups. Branched polysulfides having three or more mercaptan groups can be prepared using trichloropropane in the reaction mixture. Examples of useful polysulfides are described, for example, in U.S. Pat. No. 2,466,963 (Patrick et al); U.S. Pat. No. 2,789,958 (Fettes et al); U.S. Pat. No. 4,165,425(Bertozzi); and U.S. Pat. No. 5,610,243 (Vietti et al.). Polysulfides are commercially available under the trademarks "THIOKOL" and "LP" from Toray Fine Chemicals Co., Ltd., Urayasu, Japan and are exemplified by grades "LP-2", "LP-2C" (branched), "LP-3", "LP-33", and "LP-541".

Polythioethers and polysulfides can have a variety of useful molecular weights. In some embodiments, the polythioethers and polysulfides have number average molecular weights in a range from 500 grams per mole to 20,000 grams per mole, 1,000 grams per mole to 10,000 grams per mole, or 2,000 grams per mole to 5,000 grams per mole.

A variety of polyepoxides having more than one epoxide group are useful in the method according to the present disclosure. In some embodiments, the polyepoxide is monomeric. In some embodiments, the polyepoxide is oligomeric or polymeric (that is, an epoxy resin). A monomeric polyepoxide may be an alkylene, arylene, alkylarylene, arylalkylene, or alkylenearylalkylene having at least two epoxide groups, wherein any of the alkylene, alkylarylene, arylalkylene, or alkylenearylalkylene are optionally interrupted by one or more ether (i.e., —O—), thioether (i.e., —S—), or amine (i.e., —$NR^1$—) groups and optionally substituted by alkoxy, hydroxyl, or halogen (e.g., fluoro, chloro, bromo, iodo). Useful monomeric polyepoxides may be diepoxides or polyepoxides with more than 2 (in some embodiments, 3 or 4) epoxide groups. An epoxy resin may be prepared by chain-extending any of such polyepoxides.

Some useful polyepoxides are aromatic. Useful aromatic polyepoxides and epoxy resins typically contain at least one (in some embodiments, at least 2, in some embodiments, in a range from 1 to 4) aromatic ring (e.g., phenyl group) that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For polyepoxides and epoxy resin repeating units containing two or more aromatic rings, the rings may be connected, for example, by a branched or straight-chain alkylene group having 1 to 4 carbon atoms that may optionally be substituted by halogen (e.g., fluoro, chloro, bromo, iodo). In some embodiments, the aromatic polyepoxide or epoxy resin is a novolac. In these embodiments, the novolac epoxy may be a phenol novolac, an ortho-, meta-, or para-cresol novolac, or a combination thereof. In some embodiments, the aromatic polyepoxide or epoxy resin is a bisphenol diglycidyl ether, wherein the bisphenol (i.e., —O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. In some embodiments, the polyepoxide is a novolac epoxy resin (e.g., phenol novolacs, ortho-, meta-, or para-cresol novolacs or combinations thereof), a bisphenol epoxy resin (e.g., bisphenol A, bisphenol F, halogenated bisphenol epoxies, and combinations thereof), a resorcinol epoxy resin, and combinations of any of these. Examples of useful aromatic monomeric polyepoxides include the diglycidyl ethers of bisphenol A and bisphenol F and tetrakis glycidyl-4-phenylolethane and mixtures thereof.

Some useful polyepoxides are non-aromatic. The non-aromatic epoxy can include a branched or straight-chain alkylene group having 1 to 20 carbon atoms optionally interrupted with at least one —O— and optionally substituted by hydroxyl. In some embodiments, the non-aromatic epoxy can include a poly(oxyalkylene) group having a plurality (x) of oxyalkylene groups, $OR^1$, wherein each $R^1$ is independently $C_2$ to $C_5$ alkylene, in some embodiments, $C_2$ to $C_3$ alkylene, x is 2 to about 6, 2 to 5, 2 to 4, or 2 to 3. Examples of useful non-aromatic monomeric polyepoxides include ethylene glycol diglycidyl ether, propylene glycol diglycidyl ether, diethylene glycol diglycidyl ether, dipropylene glycol diglycidyl ether, polyethylene glycol diglycidyl ether, polypropylene glycol diglycidyl ether, glycerol diglycidyl ether, propanediol diglycidyl ether, butanediol diglycidyl ether, and hexanediol diglycidyl ether. Examples of useful polyepoxides having more than two epoxide groups include glycerol triglycidyl ether, and polyglycidyl ethers of 1,1,1-trimethylolpropane, pentaerythritol, and sorbitol. Other examples of useful polyepoxides include glycidyl ethers of cycloaliphatic alcohols (e.g., 1,4-cyclohexanedimethanol, bis(4-hydroxycyclohexyl)methane or 2,2-bis(4-hydroxycyclohexyl)propane), cycloaliphatic epoxy resins (e.g., bis(2,3-epoxycyclopentyl) ether, 2,3-epoxycyclopentyl glycidyl ether, 1,2-bis(2,3-epoxycyclopentyloxy)ethane and 3,4-epoxycyclohexylmethyl 3',4'-epoxycyclohexanecarboxylate), and hydantoin diepoxide. Examples of polyepoxides having amine groups include poly(N-glycidyl) compounds obtainable by dehydrochlorinating the reaction products of epichlorohydrin with amines containing at least two amine hydrogen atoms. These amines are, for example, aniline, n-butylamine, bis(4-aminophenyl) methane, m-xylylenediamine or bis(4-methylaminophenyl) methane. Examples of polyepoxides having thioether groups include di-S-glycidyl derivatives of dithiols (e.g., ethane-1, 2-dithiol or bis(4-mercaptomethylphenyl) ether).

In some embodiments of compositions useful in the methods according to the present disclosure, the polyepoxide is an oligomeric or polymeric diepoxide. In some embodiments, epoxides may be chain extended to have any desirable epoxy equivalent weight. Chain extending epoxy resins can be carried out by reacting a monomeric diepoxide, for example, with a diol in the presence of a catalyst to make a linear polymer. In some embodiments, the resulting epoxy resin (e.g., either an aromatic or non-aromatic epoxy resin) may have an epoxy equivalent weight of at least 150, 170, 200, or 225 grams per equivalent. In some embodiments, the aromatic epoxy resin may have an epoxy equivalent weight of up to 2000, 1500, or 1000 grams per equivalent. In some embodiments, the aromatic epoxy resin may have an epoxy equivalent weight in a range from 150 to 2000, 150 to 1000, or 170 to 900 grams per equivalent. Epoxy equivalent weights may be selected, for example, so that the epoxy resin may be used as a liquid.

Mixtures of polythiols and mixtures of polyepoxides, including any of those described above, may also be useful. Typically the amounts of the polythiol(s) and polyepoxide(s) are selected for the composition so that there is a stoichiometric equivalence of mercaptan groups and epoxide groups.

When used in sealant applications, for example, compositions useful for practicing the present disclosure can also contain fillers. Conventional inorganic fillers such as silica (e.g., fumed silica), calcium carbonate, aluminum silicate, and carbon black may be useful as well as low density fillers. In some embodiments, the composition disclosed herein includes at least one of silica, hollow ceramic elements, hollow polymeric elements, calcium silicates, calcium carbonate, or carbon black. Silica, for example, can be of any desired size, including particles having an average size above 1 micrometer, between 100 nanometers and 1 micrometer, and below 100 nanometers. Silica can include nanosilica and amorphous fumed silica, for example. Suitable low density fillers may have a specific gravity ranging from about 1.0 to about 2.2 and are exemplified by calcium silicates, fumed silica, precipitated silica, and polyethylene. Examples include calcium silicate having a specific gravity of from 2.1 to 2.2 and a particle size of from 3 to 4 microns ("HUBERSORB HS-600", J. M. Huber Corp.) and fumed silica having a specific gravity of 1.7 to 1.8 with a particle size less than 1 ("CAB-O-SIL TS-720", Cabot Corp.). Other examples include precipitated silica having a specific gravity of from 2 to 2.1 ("HI-SIL TS-7000", PPG Industries), and polyethylene having a specific gravity of from 1 to 1.1 and a particle size of from 10 to 20 microns ("SHAMROCK S-395" Shamrock Technologies Inc.). The term "ceramic" refers to glasses, crystalline ceramics, glass-ceramics, and combinations thereof. Hollow ceramic elements can include hollow spheres and spheroids. The hollow ceramic elements and hollow polymeric elements may have one of a variety of useful sizes but typically have a maximum dimension of less than 500 micrometers, more typically less than 100 micrometers. The specific gravities of the microspheres range from about 0.1 to 0.7 and are exemplified by polystyrene foam, microspheres of polyacrylates and polyolefins, and silica microspheres having particle sizes ranging from 5 to 100 microns and a specific gravity of 0.25 ("ECCOSPHERES", W. R. Grace & Co.). Other examples include elastomeric particles available, for example, from Akzo Nobel, Amsterdam, The Netherlands, under the trade designation "EXPANCEL". Yet other examples include alumina/silica microspheres having particle sizes in the range of 5 to 300 microns and a specific gravity of 0.7 ("FILLITE", Pluess-Stauffer International), aluminum silicate microspheres having a specific gravity of from about 0.45 to about 0.7 ("Z-LIGHT"), and calcium carbonate-coated polyvinylidene copolymer microspheres having a specific gravity of 0.13 ("DUALITE 6001AE", Pierce & Stevens Corp.). Further examples of commercially available materials suitable for use as hollow, ceramic elements include glass bubbles marketed by 3M Company, Saint Paul, Minn., as "3M GLASS BUBBLES" in grades K1, K15, K20, K25, K37, K46, S15, S22, S32, S35, S38, S38HS, S38XHS, S42HS, S42XHS, S60, S60HS, iM30K, iM16K, XLD3000, XLD6000, and G-65, and any of the HGS series of "3M GLASS BUBBLES"; glass bubbles marketed by Potters Industries, Carlstadt, N.J., under the trade designations "Q-CEL HOLLOW SPHERES" (e.g., grades 30, 6014, 6019, 6028, 6036, 6042, 6048, 5019, 5023, and 5028); and hollow glass particles marketed by Silbrico Corp., Hodgkins, Ill. under the trade designation "SIL-CELL" (e.g., grades SIL 35/34, SIL-32, SIL-42, and SIL-43). Such fillers, alone or in combination, can be present in a sealant in a range from 10 percent by weight to 55 percent by weight, in some embodiments, 20 percent by weight to 50 percent by weight, based on the total weight of the sealant composition. The presence of filler in the composition also has the advantageous effect of increasing the open time of the composition in some cases.

When used in sealant applications, for example, compositions useful for practicing the present disclosure can also contain at least one of cure accelerators, surfactants, adhesion promoters, thixotropic agents, pigments, and solvents. The solvent can conveniently be any material (e.g., N-methyl-2-pyrrolidone, tetrahydrofuran, ethyl acetate, or those described below) capable of dissolving the photolatent base or another component of the composition.

In some embodiments, compositions useful for practicing the present disclosure include at least one oxidizing agent. Oxidizing agents can be useful, for example, when the composition according to the present disclosure includes a polysulfide oligomer or polymer. In these compositions, oxidizing agents can minimize the degradation or interchanging of disulfide bonds in the sealant network. Useful oxidizing agents include a variety of organic and inorganic oxidizing agents (e.g., organic peroxides and metal oxides). Examples of metal oxides useful as oxidizing agents include calcium dioxide, manganese dioxide, zinc dioxide, lead dioxide, lithium peroxide, and sodium perborate hydrate. Other useful inorganic oxidizing agents include sodium dichromate. Examples of organic peroxides useful as oxidizing agents include hydroperoxides (e.g., cumene, tert-butyl or tert-amyl hydroperoxide), dialkyl peroxides (e.g., di-tert-butylperoxide, dicumylperoxide, or cyclohexyl peroxide), peroxyesters (e.g., tert-butyl perbenzoate, tert-butyl peroxy-2-ethylhexanoate, tert-butyl peroxy-3,5,5-trimethylhexanoate, tert-butyl monoperoxymaleate, or di-tert-butyl peroxyphthalate), peroxycarbonates (e.g., tert-butylperoxy 2-ethylhexylcarbonate, tert-butylperoxy isopropyl carbonate, or di(4-tert-butylcyclohexyl) peroxydicarbonate), ketone peroxides (e.g., methyl ethyl ketone peroxide, 1,1-di(tert-butylperoxy)cyclohexane, 1,1-di(tert-butylperoxy)-3,3,5-trimethylcyclohexane, and cyclohexanone peroxide), and diacylperoxides (e.g., benzoyl peroxide or lauryl peroxide). Other useful organic oxidizing agents include para-quinone dioxime.

As shown in the Examples, below, the method according to the present disclosure can provide at least a non-tacky skin on the surface of the composition even when the composition contains filler. When the samples were exposed to 455 nm blue light, cure depths of up to 0.25 millimeter were achieved. Such cure depths were achieved even when manganese dioxide was used as an oxidant. In polysulfide-based sealants, manganese dioxide is commonly added as an oxidation agent with excess to prevent disulfide bond degradation or interchanging. However, manganese dioxide is black and typically tends to limit the depth of curing.

The solution useful for practicing the method according to the present disclosure includes a photolatent base catalyst. A photolatent base catalyst photochemically generates a base that can catalyze the reaction between the polythiol and the polyepoxide. In the compositions and methods disclosed herein, the base is a first amine.

In some embodiments of the method according to the present disclosure, the composition also includes a second amine. The presence of a second amine can be useful, for example, when the thickness of the composition, the presence and nature of filler, the existence and size of areas shielded from light, and other factors prevent the curing of the composition to the desired non-tackiness and hardness or to the desired depth as described above. The second amine may also be present when the composition is a sealant composition, for example, designed to cure under ambient conditions. Sealants designed to cure under ambient conditions do not require heating above ambient conditions to cure, which may prevent unpredictable performance that may be associated with overheating either the sealant material, the structure to be sealed, or both. In some embodiments, the second amine is different from the first amine. In some embodiments, the first amine and the second amine are the same amine.

The first amine and second amine can independently be any compound including one to four basic nitrogen atoms that bear a lone pair of electrons. The first amine and second amine can independently include primary, secondary, and tertiary amine groups. The nitrogen atom(s) in the first amine and second amine can be bonded to alkyl groups, aryl groups, arylalkylene groups, alkylarylene, alkylarylenealkylene groups, or a combination thereof. The first amine and second amine can also be cyclic amines, which can include one or more rings and can be aromatic or non-aromatic (e.g., saturated or unsaturated). One or more of the nitrogen atoms in the amine can be part of a carbon-nitrogen double bond. While in some embodiments, the first amine and second amine independently include only carbon-nitrogen, nitrogen-hydrogen, carbon-carbon, and carbon-hydrogen bonds, in other embodiments, the first amine and second amine can include other functional groups (e.g., hydroxyl or ether group). However, it is understood by a person skilled in the art that a compound including a nitrogen atom bonded to a carbonyl group is an amide, not an amine, and has different chemical properties from an amine. The first amine and second amine can include carbon atoms that are bonded to more than one nitrogen atom. Thus, the first amine and second amine can independently be a guanidine or amidine. As would be understood by a person skilled in the art, lone pair of electrons on one or more nitrogens of the first amine and second amine distinguishes them from quaternary ammonium compounds, which have a permanent positive charge regardless of pH.

Examples of useful first and second amines include propylamine, butylamine, pentylamine, hexylamine, triethylamine, dimethylethanolamine, benzyldimethylamine, dimethylaniline, tribenzylamine, triphenylamine, tetramethylguanidine (TMG), 1,8-diazabicyclo[5.4.0]undec-7-ene (DBU), 1,5-diazabicyclo[4.3.0]non-5-ene (DBN), 1,4-diazabicyclo[2.2.2]octane (DABCO), quinuclidine, diphenylguanidine (DPG), dimethylaminomethyl phenol, and tris(dimethylaminomethyl)phenol. In some embodiments, the first amine and second amine are each independently tertiary amines (including amidines) or guanidines.

The second amine and its amount may be selected to provide the composition with a desirable amount of open time (that is, the length of time it takes for the composition to become at least partially gelled) after it is mixed or thawed. In some embodiments, the composition has an open time of at least 10 minutes, at least 30 minutes, at least one hour, or at least two hours. Such working times can be useful, for example, for the production of very large structures, as is typical in the aircraft industry. The amount of the second amine and its conjugate acid pKa both affect the open time. A composition with a smaller amount of a second amine having a higher pKa may have the same open time as a composition having a larger amount of a second amine having a lower pKa. For a second amine with a moderate conjugate acid pKa value in a range from about 7 to about 10, an amount of second amine in a range from 0.05 weight percent to about 10 weight percent (in some embodiments, 0.05 weight percent to 7.5 weight percent, or 1 weight percent to 5 weight percent) may be useful. For a second amine with a higher conjugate acid pKa value of about 11 or more, an amount of second amine in a range from 0.005 weight percent to about 3 weight percent (in some embodiments, 0.05 weight percent to about 2 weight percent) may be useful. In some embodiments in which the second amine is different from the first amine, the second amine has a lower conjugate acid pKa value than the first amine. This may be useful, for example, for achieving a desirable amount of open time and a desirably fast cure-on-demand. In some embodiments in which the second amine is different from the first amine, the first amine and the second amine have the same conjugate acid pKa value.

While the first amine is photochemically generated from a photolatent base, the first and second amines themselves are generally not considered photolatent bases. That is, they do not undergo photochemical reactions that generate an amine by photocleavage, photoelimination, or another mechanism.

A variety of photolatent bases can be useful in the solution useful for practicing the present disclosure. Many useful photolatent bases, any of which may be useful for practicing the present disclosure, have been reviewed in Suyama, K. and Shirai, M., "Photobase Generators: Recent Progress and Application Trend in Polymer Systems" *Progress in Polymer Science* 34 (2009) 194-209. Photolatent bases useful for practicing the present disclosure include photocleavable carbamates (e.g., 9-xanthenylmethyl, fluorenylmethyl, 4-methoxyphenacyl, 2,5-dimethylphenacyl, benzyl, and others), which have been shown to generate primary or secondary amines after photochemical cleavage and liberation of carbon dioxide. Other photolatent bases described in the review as useful for generating primary or secondary amines include certain O-acyloximes, sulfonamides, and formamides. Acetophenones, benzophenones, and acetonaphthones bearing quaternary ammonium substituents are reported to undergo photocleavage to generate tertiary amines in the presence of a variety of counter cations (borates, dithiocarbamates, and thiocyanates). Examples of these photolatent ammonium salts are N-(benzophenonemethyl)tri-N-alkyl ammonium triphenylborates. Certain sterically hindered α-aminoketones are also reported to generate tertiary amines.

Recently, quaternary ammonium salts made from a variety of amines and phenylglyoxylic acid have been shown to generate amines that catalyze a thiol/epoxy reaction after exposure to UV light. (See Salmi, H., et al. "Quaternary Ammonium Salts of Phenylglyoxylic acid as Photobase Generators for Thiol-Promoted Epoxide Photopolymerization" *Polymer Chemistry* 5 (2014) 6577-6583.) Such salts are also suitable as photolatent bases useful for practicing the present disclosure.

In some embodiments, the photolatent base useful for practicing the present disclosure is a 1,3-diamine compound represented by the formula $N(R_7)(R_6)$—$CH(R_5)$—$N(R_4)$—$C(R_1)(R_2)(R_3)$ such as those described in U.S. Pat. No. 7,538,104 (Baudin et al.). Such compounds can be considered arylalkylenyl substituted reduced amidines or guanidines. In formula $N(R_7)(R_6)$—$CH(R_5)$—$N(R_4)$—$C(R_1)(R_2)(R_3)$, $R_1$ is selected from aromatic radicals, heteroaromatic radicals, and combinations thereof that absorb light in the wavelength range from 200 nm to 650 nm and that are unsubstituted or substituted one or more times by at least one monovalent group selected from $C_1$-$C_{18}$ alkyl, $C_2$-$C_{18}$ alkenyl, $C_2$-$C_{18}$ alkynyl, $C_1$-$C_{18}$ haloalkyl, —$NO_2$, —$NR_{10}R_{11}$, —CN, —$OR_{12}$, —$SR_{12}$, —$C(O)R_{13}$, —$C(O)OR_{14}$, halogen, groups of the formula $N(R_7)(R_6)$—$CH(R_5)$—$N(R_4)$—$C(R_2)(R_3)$— where $R_2$-$R_7$ are as defined below, and combinations thereof, and that upon absorption of light in the wavelength range from 200 nm to 650 nm bring about a photoelimination that generates an amidine or guanidine. $R_2$ and $R_3$ are each independently selected from hydrogen, $C_1$-$C_{18}$ alkyl, phenyl, substituted phenyl (that is, substituted one or more times by at least one monovalent group selected from $C_1$-$C_{18}$ alkyl, —CN, —$OR_{12}$, —$SR_{12}$, halogen, $C_1$-$C_{18}$ haloalkyl, and combinations thereof), and combinations thereof; $R_5$ is selected from $C_1$-$C_{18}$ alkyl, —$NR_8R_9$, and combinations thereof; $R_4$, $R_6$, $R_7$, $R_8$, $R_9$, $R_{10}$ and $R_{11}$ are each independently selected from hydrogen, $C_1$-$C_{18}$ alkyl, and combinations thereof; or $R_4$ and $R_6$ together form a $C_2$-$C_{12}$ alkylene bridge that is unsubstituted or is substituted by one or more monovalent groups selected from $C_1$-$C_4$ alkyl radicals and combinations thereof; or $R_5$ and $R_7$, independently of $R_4$ and $R_6$, together form a $C_2$-$C_{12}$ alkylene bridge that is unsubstituted or is substituted by one or more monovalent groups selected from $C_1$-$C_4$ alkyl radicals and combinations thereof; or, if $R_5$ is —$NR_8R_9$, then $R_7$ and $R_9$ together form a $C_2$-$C_{12}$ alkylene bridge that is unsubstituted or is substituted by one or more monovalent groups selected from $C_1$-$C_4$ alkyl radicals and combinations thereof; $R_{12}$ and $R_{13}$ are each independently selected from hydrogen, $C_1$-$C_{19}$ alkyl, and combinations thereof; and $R_{14}$ is selected from $C_1$-$C_{19}$ alkyl and combinations thereof. The alkyl and haloalkyl groups can be linear or branched and, in some embodiments, contain 1 to about 12 carbon atoms (in some embodiments, 1 to about 6 carbon atoms). In some embodiments, halogen atoms are chlorine, fluorine, and/or bromine (in some embodiments, chlorine and/or fluorine). The alkenyl groups can be linear or branched and, in some embodiments, contain 2 to about 12 carbon atoms (in some embodiments, 2 to about 6 carbon atoms). The alkynyl groups can be linear or branched and, in some embodiments, contain 2 to about 12 carbon atoms (in some embodiments, 2 to about 6 carbon atoms).

In some embodiments of formula $N(R_7)(R_6)$—$CH(R_5)$—$N(R_4)$—$C(R_1)(R_2)(R_3)$, $R_1$ is selected from substituted and unsubstituted phenyl, naphthyl, phenanthryl, anthryl, pyrenyl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, anthraquinonyl, dibenzofuryl, chromenyl, xanthenyl, thioxanthyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, terphenyl, stilbenyl, fluorenyl, phenoxazinyl, and combinations thereof, any of these being unsubstituted or substituted one or more times by $C_1$-$C_{18}$ alkyl, $C_2$-$C_{18}$ alkenyl, $C_2$-$C_{18}$ alkynyl, $C_1$-$C_{18}$ haloalkyl, —$NO_2$, —$NR_{10}R_{11}$, —CN, —$OR_{12}$, —$SR_{12}$, —$C(O)R_{13}$, —$C(O)OR_{14}$, halogen, a radical of the formula $N(R_7)(R_6)$—$CH(R_5)$—$N(R_4)$—$C(R_2)(R_3)$—, or a combination thereof, where $R_2$-$R_7$ and $R_{10}$-$R_{14}$ are as defined above. In some embodiments of formula $N(R_7)(R_6)$—$CH(R_5)$—$N(R_4)$—$C(R_1)(R_2)(R_3)$, $R_1$ is a substituted or unsubstituted biphenylyl radical, wherein each phenyl group is independently substituted with from zero to three (preferably, zero or one) substituents selected from $C_1$-$C_{18}$ alkyl, $C_2$-$C_{18}$ alkenyl, —OH, —CN, —$OR_{10}$, —$SR_{10}$, halogen, radicals of the formula $N(R_7)(R_6)$—$CH(R_5)$—$N(R_4)$—$C(R_2)(R_3)$—, and combinations thereof, where $R_2$-$R_7$ and $R_{10}$-$R_{14}$ are as defined above. In some embodiments of formula $N(R_7)(R_6)$—$CH(R_5)$—$N(R_4)$—$C(R_1)(R_2)(R_3)$, $R_1$ is selected from phenyl, 3-methoxyphenyl, 4-methoxyphenyl, 2,4,6-trimethoxyphenyl, 2,4-dimethoxyphenyl, and combinations thereof.

In some embodiments of formula $N(R_7)(R_6)$—$CH(R_5)$—$N(R_4)$—$C(R_1)(R_2)(R_3)$, $R_2$ and $R_3$ each are independently selected from hydrogen, $C_1$-$C_6$ alkyl, and combinations thereof (in some embodiments, both are hydrogen); $R_4$ and $R_6$ together form a $C_2$-$C_6$ alkylene (in some embodiments, $C_3$ alkylene) bridge that is unsubstituted or is substituted by one or more groups selected from $C_1$-$C_4$ alkyl radicals and combinations thereof; and/or $R_5$ and $R_7$ together form a $C_2$-$C_6$ alkylene (in some embodiments, $C_3$ or $C_5$ alkylene) bridge that is unsubstituted or is substituted by one or more groups selected from $C_1$-$C_4$ alkyl radicals and combinations thereof, or, if $R_5$ is —$NR_8R_9$, $R_9$ and $R_7$ together form a $C_2$-$C_6$ alkylene bridge that is unsubstituted or substituted by one or more groups selected from $C_1$-$C_4$ alkyl radicals and combinations thereof.

Examples of suitable photolatent bases useful for practicing the present disclosure include 5-benzyl-1,5-diazabicyclo[4.3.0]nonane, 5-(anthracen-9-yl-methyl)-1,5-diaza[4.3.0]nonane, 5-(2'-nitrobenzyl)-1,5-diazabicyclo[4.3.0]nonane, 5-(4'-cyanobenzyl)-1,5-diazabicyclo[4.3.0]nonane, 5-(3'-cyanobenzyl)-1,5-diazabicyclo[4.3.0]nonane, 5-(anthraquinon-2-yl-methyl)-1,5-diaza[4.3.0]nonane, 5-(2'-chlorobenzyl)-1,5-diazabicyclo[4.3.0]nonane, 5-(4'-methylbenzyl)-1,5-diazabicyclo[4.3.0]nonane, 5-(2',4',6'-trimethylbenzyl)-1,5-diazabicyclo[4.3.0]nonane, 5-(4'-ethenylbenzyl)-1,5-diazabicyclo[4.3.0]nonane, 5-(3'-trimethylbenzyl)-1,5-diazabicyclo[4.3.0]nonane, 5-(2',3'-dichlorobenzyl)-1,5-diazabicyclo[4.3.0]nonane, 5-(naphth-2-yl-methyl-1,5-diazabicyclo[4.3.0]nonane, 1,4-bis(1,5-diazabicyclo[4.3.0]nonanylmethyl)benzene, 8-benzyl-1,8-diazabicyclo[5.4.0]undecane, 8-benzyl-6-methyl-1,8-diazabicyclo[5.4.0]undecane, 9-benzyl-1,9-diazabicyclo[6.4.0]dodecane, 10-benzyl-8-methyl-1,10-diazabicyclo[7.4.0]tridecane, 11-benzyl-1,11-diazabicyclo[8.4.0]tetradecane, 8-(2'-chlorobenzyl)-1,8-diazabicyclo[5.4.0]undecane, 8-(2',6'-dichlorobenzyl)-1,8-diazabicyclo[5.4.0]undecane, 4-(diazabicyclo[4.3.0]nonanylmethyl)-1,1'-biphenyl, 4,4'-bis(diazabicyclo[4.3.0]nonanylmethyl)-11'-biphenyl, 5-benzyl-2-methyl-1,5-diazabicyclo[4.3.0]nonane, 5-benzyl-7-methyl-1,5,7-triazabicyclo[4.4.0]decane, and combinations thereof. Such compounds can be made, for example, using the methods described in U.S. Pat. No. 7,538,104 (Baudin et al.), assigned to BASF, Ludwigshafen, Germany.

Other suitable photolatent bases useful for the compositions according to the present disclosure and/or for practicing the methods disclosed herein include those described in U.S. Pat. No. 6,410,628 (Hall-Goulle et al.), U.S. Pat. No. 6,087,070 (Turner et al.), U.S. Pat. No. 6,124,371 (Stanssens et al.), and U.S. Pat. No. 6,057,380 (Birbaum et al.), and U.S. Pat. Appl. Pub. No. 2011/01900412 (Studer et al.).

In some embodiments, useful photolatent bases absorb light in a wavelength range from 200 nm to 650 nm. For some applications (e.g., sealants), compositions according to the present disclosure (which include the photolatent base) absorb light in the ultraviolet A (UVA) and/or blue light regions, for example, in a wavelength range from 315 nm to 550 nm or 315 nm to 500 nm. UVA light can be considered to have a wavelength range of 315 nm to 400 nm, and blue light can be considered to have a wavelength range of 450 nm to 495 nm.

In some embodiments, the solution useful for practicing the method according to the present disclosure further includes at least one photosensitizer. A photosensitizer can be useful, for example, if the photolatent base does not have a strong absorbance in a wavelength range that is desired for curing the composition. As used herein, a photosensitizer may be understood to be, for example, a compound having an absorption spectrum that overlaps or closely matches the emission spectrum of the radiation source to be used and that can improve the overall quantum yield by means of, for example, energy transfer or electron transfer to other component(s) of the composition (e.g., the photolatent base). Useful photosensitizers include aromatic ketones (e.g., substituted or unsubstituted benzophenones, substituted or unsubstituted thioxanthones, substituted or unsubstituted anthraquinones, and combinations thereof), dyes (e.g., oxazines, acridines, phenazines, rhodamines, and combinations thereof), 3-acylcoumarins (e.g., substituted and unsubstituted 3-benzoylcoumarins and substituted and unsubstituted 3-naphthoylcoumarins, and combinations thereof), anthracenes (e.g., substituted and unsubstituted anthracenes), 3-(2-benzothiazolyl)-7-(diethylamino)coumarin (coumarin 6), 10-acetyl-2,3,6,7-tetrahydro-1H,5H,11H-[1]benzopyrano[6,7,8-ij]quinolizin-11-one (coumarin 521), other carbonyl compounds (e.g., camphorquinone, 4-phenylacetophenone, benzil, and xanthone, and combinations thereof), and combinations thereof. In some embodiments, the photosensitizer has an absorbance in the blue light range. In some embodiments, the photosensitizer is camphorquinone. The amount of photosensitizer can vary widely, depending upon, for example, its nature, the nature of other component(s) of the photoactivatable composition, and the particular curing conditions. The photosensitizer may be present in the solution at any suitable concentration, (e.g., from about 5 percent to about 90 percent by weight, 10 percent to 85 percent by weight, or 25 percent to 75 percent by weight, based on the total weight of the solution).

The method of making a polymer network according to the present disclosure includes exposing the composition disclosed herein in any of its embodiments to light to generate the first amine to at least partially cure at least the surface of the composition. The light source and exposure time can be selected, for example, based on the nature and amount of the composition. Sources of ultraviolet and/or visible light can be useful (for example, wavelengths ranging from about 200 nm to about 650 nm, from about 315 nm to 550 nm, or from about 315 nm to 500 nm can be useful). Suitable light includes sunlight and light from artificial sources, including both point sources and flat radiators. In some embodiments, the light source is a source of at least one of UVA or blue light. In some embodiments, the light source is a blue light source.

Examples of useful light sources include carbon arc lamps; xenon arc lamps; medium-pressure, high-pressure, and low-pressure mercury lamps, doped if desired with metal halides (metal halogen lamps); microwave-stimulated metal vapor lamps; excimer lamps; superactinic fluorescent tubes; fluorescent lamps; incandescent argon lamps; electronic flashlights; xenon flashlights; photographic flood lamps; light-emitting diodes; laser light sources (for example, excimer lasers); and combinations thereof. The distance between the light source and the coated substrate can vary widely, depending upon the particular application and the type and/or power of the light source. For example, distances up to about 150 cm, distances from about 0.01 cm to 150 cm, or a distance as close as possible without touching the composition can be useful.

Polymer networks prepared with polythiols and polyepoxides as described above in any of their embodiments are useful for a variety of applications. For example, such polymer networks can be useful as sealants, for example, aviation fuel resistant sealants. Aviation fuel resistant sealants are widely used by the aircraft industry for many purposes. Commercial and military aircraft are typically built by connecting a number of structural members, such as longitudinal stringers and circular frames. The aircraft skin, whether metal or composite, is attached to the outside of the stringers using a variety of fasteners and adhesives. These structures often include gaps along the seams, joints between the rigidly interconnected components, and overlapping portions of the exterior aircraft skin. The composition according to the present disclosure can be useful, for example, for sealing such seams, joints, and overlapping portions of the aircraft skin. The composition may be applied, for example, to aircraft fasteners, windows, access panels, and fuselage protrusions. As a sealant, the composition disclosed herein may prevent the ingress of weather and may provide a smooth transition between the outer surfaces to achieve desired aerodynamic properties. The composition according to the present disclosure may likewise be applied to interior assembles to prevent corrosion, to contain the various fluids and fuels necessary to the operation of an aircraft, and to allow the interior of the aircraft (e.g., the passenger cabin) to maintain pressurization at higher altitudes. Among these uses are the sealing of integral fuel tanks and cavities.

Aircraft exterior and interior surfaces, to which sealants may be applied, may include metals such as titanium, stainless steel, and aluminum, and/or composites, any of which may be anodized, primed, organic-coated or chromate-coated. For example, a dilute solution of one or more phenolic resins, organo-functional silanes, titanates or zirconates, and a surfactant or wetting agent dissolved in organic solvent or water may be applied to an exterior or interior surface and dried.

Sealants may optionally be used in combination with a seal cap, for example, over rivets, bolts, or other types of fasteners. A seal cap may be made using a seal cap mold, filled with a curable sealant, and placed over a fastener. The curable sealant may then be cured. In some embodiments, the seal cap and the curable sealant may be made from the same material. In some embodiments, the seal cap may be made from a curable composition disclosed herein. For more details regarding seal caps, see, for example, Int. Pat. App. Pub. No. WO2014/172305 (Zook et al.).

In some embodiments, polymer networks prepared from the method according to the present disclosure may be useful in these applications, for example, because of their fuel resistance and low glass transition temperatures. In some embodiments, the polymer network prepared according to the present disclosure has a low glass transition temperature, in some embodiments less than −20° C., in some embodiments less than −30° C., in some embodiments less than −40° C., and in some embodiments less than −50° C. In some embodiment, the polymer network prepared according to the present disclosure has high jet fuel resistance, characterized by a volume swell of less than 30% and a weight gain of less than 20% when measured according to Society of Automotive Engineers (SAE) International Standard AS5127/1.

Some Embodiments of the Disclosure

In a first embodiment, the present disclosure provides a method of making a polymer network, the method comprising:

providing a composition comprising a polythiol comprising more than one thiol group and a polyepoxide comprising more than one epoxide group;

applying a solution comprising a photolatent base catalyst to a surface of the composition; and subsequently exposing the composition to light, wherein upon exposure to light, the photolatent base catalyst photochemically generates a first amine and at least partially cures at least the surface of the composition to form the polymer network.

In a second embodiment, the present disclosure provides the method of the first embodiment, further comprising allowing the solution to penetrate into the composition.

In a third embodiment, the present disclosure provides the method of the first or second embodiment, wherein applying comprises at least one of spraying, brushing, or coating.

In a fourth embodiment, the present disclosure provides the method of any one of the first to third embodiments, wherein the solution further comprises a solvent comprising at least one of an aliphatic or alicyclic hydrocarbon, an aromatic solvent, ether, ester, alcohol, ketone, sulfoxide, amide, or halogenated solvent.

In a fifth embodiment, the present disclosure provides the method of any one of the first to fourth embodiments, wherein the solution further comprises a photosensitizer.

In a sixth embodiment, the present disclosure provides the method of fifth embodiment, wherein the photosensitizer has an absorbance in at least one of an ultraviolet A or blue light range.

In a seventh embodiment, the present disclosure provides the method of any one of the first to sixth embodiments, wherein the light comprises at least one of ultraviolet A light or blue light.

In an eighth embodiment, the present disclosure provides the method of the any one of the first to seventh embodiments, wherein the photosensitizer has an absorbance in the blue light range. In some of these embodiments, the photosensitizer is camphorquinone.

In a ninth embodiment, the present disclosure provides the method of any one of the first to eighth embodiments, wherein the light comprises blue light.

In a tenth embodiment, the present disclosure provides the method of any one of the first to ninth embodiments, wherein the first amine comprises at least one of a tertiary amine or a guanidine.

In an eleventh embodiment, the present disclosure provide the method of any one of the first to tenth embodiments, wherein the first amine comprises at least one of triethylamine, dimethylethanolamine, benzyldimethylamine, dimethylaniline, tribenzylamine, triphenylamine, tetramethylguanidine (TMG), 1,8-diazabicyclo[5.4.0]undec-7-ene (DBU), 1,5-diazabicyclo[4.3.0]non-5-ene (DBN), 1,4-diazabicyclo[2.2.2]octane (DABCO), diphenylguanidine (DPG), dimethylaminomethyl phenol, and tris(dimethylaminomethyl)phenol.

In a twelfth embodiment, the present disclosure provides the method of any one of the first to eleventh embodiments, wherein the first amine comprises at least one of tetramethylguanidine, diphenylguanidine, 1,8-diazabicyclo[5.4.0]undec-7-ene, or 1,5-diazabicyclo[4.3.0]non-5-ene.

In a thirteenth embodiment, the present disclosure provides the method of any one of the first to twelfth embodiments, wherein the composition further comprises a catalytic amount of a second amine, which may be the same or different from the first amine.

In a fourteenth embodiment, the present disclosure provides the method of the thirteenth embodiment, wherein the first amine and second amine are each independently a tertiary amine or a guanidine.

In a fifteenth embodiment, the present disclosure provides the method of the fourteenth embodiment, wherein the first amine and second amine are each independently an amidine or a guanidine.

In a sixteenth embodiment, the present disclosure provides the method of the fifteenth embodiment, at least one of the first amine or second amine is triethylamine, dimethylethanolamine, benzyldimethylamine, dimethylaniline, tribenzylamine, triphenylamine, tetramethylguanidine (TMG), 1,8-diazabicyclo[5.4.0]undec-7-ene (DBU), 1,5-diazabicyclo[4.3.0]non-5-ene (DBN), 1,4-diazabicyclo[2.2.2]octane (DABCO), quinuclidine, diphenylguanidine (DPG), dimethylaminomethyl phenol, and tris(dimethylaminomethyl)phenol.

In a seventeenth embodiment, the present disclosure provides the method of any one of the thirteenth to sixteenth embodiments, wherein at least one of the first amine or second amine comprises at least one of tetramethylguanidine, diphenylguanidine, 1,4-diazabicyclo[2.2.2]octane, quinuclidine, 1,8-diazabicyclo[5.4.0]undec-7-ene, or 1,5-diazabicyclo[4.3.0]non-5-ene.

In an eighteenth embodiment, the present disclosure provides the method of any one of the thirteenth to seventeenth embodiments, wherein the first amine has a higher conjugate acid pKa than the second amine.

In a nineteenth embodiment, the present disclosure provides the method of any one of the thirteenth to seventeenth embodiments, wherein the first amine and the second amine are the same.

In a twentieth embodiment, the present disclosure provides the method of any one of thirteenth to nineteenth embodiments, wherein the second amine is 1,4-diazabicyclo[2.2.2]octane.

In a twenty-first embodiment, the present disclosure provides the method of any one of the first to twentieth embodiments, wherein the polythiol is monomeric.

In a twenty-second embodiment, the present disclosure provides the method of any one of the first to twentieth embodiments, wherein the polythiol is oligomeric or polymeric.

In a twenty-third embodiment, the present disclosure provides the method of the twenty-second embodiment, wherein the polythiol is a polythioether.

In a twenty-fourth embodiment, the present disclosure provides the method of the twenty-third embodiment, wherein the polythiol is an oligomer or polymer prepared from components comprising a dithiol and a diene or divinyl ether.

In a twenty-fifth embodiment, the present disclosure provides the method of the twenty-second embodiment, wherein the polythiol is a polysulfide oligomer or polymer.

In a twenty-sixth embodiment, the present disclosure provides the method of the twenty-fifth embodiment, wherein the composition further comprises an oxidizing agent.

In a twenty-seventh embodiment, the present disclosure provides the method of the twenty-sixth embodiment, wherein the oxidizing agent comprises at least one of calcium dioxide, manganese dioxide, zinc dioxide, lead dioxide, lithium peroxide, sodium perborate hydrate, sodium dichromate, or an organic peroxide.

In a twenty-eighth embodiment, the present disclosure provides the method of any one of the first to twenty-seventh embodiments, wherein the composition further comprises filler.

In a twenty-ninth embodiment, the present disclosure provides the method of the twenty-eighth embodiment, wherein the filler comprises at least one of silica, carbon black, calcium carbonate, aluminum silicate, or lightweight particles having a density of up to 0.7 grams per cubic centimeter.

In a thirtieth embodiment, the present disclosure provides the method of any one of the first to twenty-ninth embodiments, wherein the polyepoxide is monomeric.

In a thirty-first embodiment, the present disclosure provides the method of any one of the first to twenty-ninth embodiments, wherein the polyepoxide is oligomeric or polymeric.

In a thirty-second embodiment, the present disclosure provides the method of any one of the first to thirty-first embodiments, wherein the polyepoxide is aromatic.

In a thirty-third embodiment, the present disclosure provides the method of any one of the first to thirty-first embodiments, wherein the polyepoxide is non-aromatic.

In a thirty-fourth embodiment, the present disclosure provides the method of any one of the first to thirty-third embodiments, wherein the polyepoxide comprises three or more epoxide groups.

In a thirty-fifth embodiment, the present disclosure provides the method of any one of the first to thirty-fourth embodiments, wherein the composition has an open time of at least ten minutes.

In a thirty-sixth embodiment, the present disclosure provides the method of any one of the first to thirty-fifth embodiments, further providing applying the composition to a substrate before applying the solution to the surface of the composition.

In a thirty-seventh embodiment, the present disclosure provides the method of any one of the first to thirty-sixth embodiments, wherein exposing the composition to light to at least partially cure at least the surface of the composition comprises forming at least a non-tacky surface.

In a thirty-eighth embodiment, the present disclosure provides the method of any one of the first to thirty-sixth embodiments, wherein exposing the composition to light to at least partially cure at least the surface of the composition comprises at least partially gelling the composition.

In a thirty-ninth embodiment, the present disclosure provides the method of any one of the first to thirty-sixth embodiments, wherein exposing the composition to light to at least partially cure the at least the surface of the composition comprises fully curing the composition.

In order that this disclosure can be more fully understood, the following examples are set forth. It should be understood that these examples are for illustrative purposes only, and are not to be construed as limiting this disclosure in any manner.

EXAMPLES

Unless otherwise noted, all reagents were obtained or are available from Sigma-Aldrich Company, St. Louis, Mo., or may be synthesized by known methods. Unless otherwise reported, all ratios are by weight percent.

The following abbreviations are used to describe the examples:
° C.: degrees Centigrade
cm: centimeter
LED: light emitting diode
mg: milligram
mL: milliliter
nm: nanometer
rpm: revolutions per minute Abbreviations for the materials used in the examples are as follows:
CGI-90: A photolatent base, obtained from BASF, Ludwigshafen, Germany.
CPQ: Camphorquinone, photosensitizer from Sigma-Aldrich Company.
DABCO: A 33% by weight solution of 1,4-Diazabicyclo[2.2.2]octane in dipropylene glycol, obtained under the trade designation "DABCO 33-LV" from Air Products & Chemicals, Inc., Allentown, Pa.
DMDO: 1,8-Dimercapto-3,6-dioxaoctane, obtained from Arkena, Inc., King of Prussia, Pa.
GE-30: Trimethylolpropane triglycidylether, obtained under the trade designation "ERISYS GE-30" from Emerald Performance Materials Company.
IPA: Isopropyl alcohol.
ITX: Isopropylthioxanthone, a photosensitizer obtained from Sigma-Aldrich Company.
LP-33: A liquid polysulfide polymer, obtained under the trade designation "THIOKOL LP-33" from Toray Fine Chemicals Co., Ltd., Urayasu, Japan.
AC-380A: Part A of a two-part polysulfide-based, manganese cured, sealant, obtained under the trade designation "AEROSPACE SEALANT AC-380 CLASS B-1/2" from 3M Company, St. Paul, Minn.
AC-380B: Part B of a two-part polysulfide-based, manganese cured, sealant, obtained under the trade designation "AEROSPACE SEALANT AC-380 CLASS B-1/2" from 3M Company.

Sprayable Catalyst A

A 20 mL amber glass vial was charged with 0.7208 grams "CGI-90" photolatent base, 0.7191 grams CPQ and 3.0932 grams IPA at 21° C. The mixture was vortex mixed until the "CGI-90" photolatent base and CPQ were completely dissolved. The mixture was then transferred to an aerosol sprayer.

Sprayable Catalyst B

A 20 mL amber glass vial was charged with 1.0 gram "CGI-90" photolatent base, 1.0 gram ITX and 7.0 grams IPA at 21° C. The mixture was vortex mixed until the "CGI-90" photolatent base and ITX were completely dissolved. The mixture was then transferred to an aerosol sprayer.

Curable Composition 1

A 20 mL amber glass vial was charged with 1.0 gram GE-30, 0.5 grams "CGI-90" photolatent base and 0.5 grams ITX at 21° C. The vial was then sealed and placed on a laboratory roller mill for 2 hours at 25 rpm until the "CGI-90" photolatent base was dissolved. The contents of the vial were then transferred to a plastic jar and 10.0 grams AC-380A manually mixed into the composition by means of a spatula.

Curable Compositions 1A and 1B 20 grams AC-380A was manually mixed with 2.0 grams GE-30 at 21° C. in a plastic jar by means of a spatula. The curable composition was then divided into equal parts, 1-A and 1-B.

Curable Compositions 2

A 20 mL amber glass vial was charged with 1.0 gram GE-30, 0.5 grams "CGI-90" photolatent base and 0.5 grams ITX at 21° C. The vial was then sealed and placed on a laboratory roller mill for 2 hours at 25 rpm until the "CGI-90" photolatent base was dissolved. The contents of the vial were then transferred to a plastic jar and 10.0 grams AC-380A and 0.1 grams AC-380B manually mixed into the composition by means of a spatula.

Curable Compositions 2A and 2B 20 grams AC-380A was manually mixed with 2.0 grams GE-30 and 0.2 grams AC-380B at 21° C. in a plastic jar by means of a spatula. The curable composition was then divided into equal parts, 2-A and 2-B.

Curable Compositions 3-5

The procedure generally described for preparing Curable Composition 2 was repeated, according to the quantities listed in Table 1.

Curable Compositions 3A and 3B Through 5A and 5B

The procedure generally described for preparing Curable Compositions 2A and 2B was repeated, according to the quantities listed in Table 1.

Curable Composition 6

A 20 mL amber glass vial was charged with 8.0 grams LP-33, 2.0 gram GE-30, 0.5 grams CGI-90 and 0.5 grams ITX at 21° C. The vial was then sealed and placed on a laboratory roller mill for 2 hours at 25 rpm until the CGI-90 was dissolved.

Curable Composition 7

A 20 mL amber glass vial was charged with 8.0 grams LP-33, 2.0 gram GE-30, 0.5 grams CGI-90 and 0.5 grams ITX at 21° C. The vial was then sealed and placed on a laboratory roller mill for 2 hours at 25 rpm until the CGI-90 was dissolved. The contents of the vial were then transferred to a plastic jar and 0.1 gram AC-380B was manually mixed into the composition by means of a spatula.

Curable Compositions 8-9

The procedure generally described for preparing Curable Composition 7 was repeated, according to the quantities listed in Table 1.

TABLE 1

| Curable Composition | Components (grams) | | | | | |
|---|---|---|---|---|---|---|
| | AC-380A | GE-30 | AC-380B | LP-33 | CGI-90 | ITX |
| 1 | 10.0 | 1.0 | 0 | 0 | 0.5 | 0.5 |
| 1A | 10.0 | 1.0 | 0 | 0 | 0 | 0 |
| 1B | 10.0 | 1.0 | 0 | 0 | 0 | 0 |
| 2 | 10.0 | 1.0 | 0.1 | 0 | 0.5 | 0.5 |
| 2A | 10.0 | 1.0 | 0.1 | 0 | 0 | 0 |
| 2B | 10.0 | 1.0 | 0.1 | 0 | 0 | 0 |
| 3 | 10.0 | 1.0 | 0.5 | 0 | 0.5 | 0.5 |
| 3A | 10.0 | 1.0 | 0.5 | 0 | 0 | 0 |
| 3B | 10.0 | 1.0 | 0.5 | 0 | 0 | 0 |
| 4 | 10.0 | 1.0 | 1.0 | 0 | 0.5 | 0.5 |
| 4A | 10.0 | 1.0 | 1.0 | 0 | 0 | 0 |
| 4B | 10.0 | 1.0 | 1.0 | 0 | 0 | 0 |
| 5 | 10.0 | 0 | 1.0 | 0 | 0.5 | 0.5 |
| 5A | 10.0 | 0 | 1.0 | 0 | 0 | 0 |
| 5B | 10.0 | 0 | 1.0 | 0 | 0 | 0 |
| 6 | 0 | 2.0 | 0 | 8.0 | 0.5 | 0.5 |
| 7 | 0 | 2.0 | 0.1 | 8.0 | 0.5 | 0.5 |
| 8 | 0 | 2.0 | 0.5 | 8.0 | 0.5 | 0.5 |
| 9 | 0 | 2.0 | 1 | 8.0 | 0.5 | 0.5 |

The compositions were transferred to 1.88 by 3.15 cm by 2.8 mm Teflon™ molds and subjected to one of the following curing protocols using a model CT2000 LED, obtained from Clearstone Technologies, Inc., Hopkins, Minn.

Examples 1 to 10

Sprayable Curing

Curable compositions 1A, 2A, 3A, 4A and 5A were evenly sprayed with approximately 35 mg Sprayable Catalyst A, allowed to dry for 1 minute at 21° C., then exposed to the LED, at 50% power, for 1 minute at a distance of 2.54 cm.

Curable compositions 1B, 2B, 3B, 4B and 5B were evenly sprayed with approximately 35 mg Sprayable Catalyst B, then dried and exposed to the LED and as per the "A" compositions above.

The thickness of cured compositions are listed in Table 2.

TABLE 2

| Example | Cured Composition | Cured Thickness (mm) |
|---|---|---|
| 1 | 1A | 0.23 |
| 2 | 1B | 0.24 |
| 3 | 2A | 0.25 |
| 4 | 2B | 0.25 |
| 5 | 3A | 0.23 |
| 6 | 3B | 0 |
| 7 | 4A | >0.1 |
| 8 | 4B | 0 |
| 9 | 5A | 0 |
| 10 | 5B | 0 |

Direct Curing

Curable Compositions 1-5 were exposed to the LED, at 50% power, for 1 minute at a distance of 2.54 cm. A second series of curable compositions were exposed for the same time and at the same distance at 100% LED power.

Curable Compositions 6-9 were cured in a similar fashion to compositions 1-5, at 50 and 75% LED power levels.

Thickness of the cured compositions 1-5 and 6-9 are listed in Tables 3 and 4, respectively.

TABLE 3

| Cured Composition | Cured Thickness (mm) | |
|---|---|---|
| | @ 50% LED Power | @ 100% LED Power |
| 1 | 0.25 | 0.20 |
| 2 | 0.20 | >0.1 |
| 3 | 0.24 | >0.1 |
| 4 | >0.1 | Surface charred |
| 5 | 0.30 | Surface charred |

TABLE 4

| Cured Composition | Cured Thickness (mm) | |
|---|---|---|
| | @ 50% LED Power | @ 75% LED Power |
| 6 | 0 | 2.45 |
| 7 | 0 | 1.09 |
| 8 | 0 | 1.63 |
| 9 | 0 | Sample charred |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A method of making a polymer network, the method comprising:
providing a composition comprising a polythiol comprising more than one thiol group and a polyepoxide comprising more than one epoxide group;
applying a solution comprising a photolatent base catalyst to a surface of the composition; and
subsequently exposing the composition to light, wherein upon exposure to light, the photolatent base catalyst photochemically generates a first amine that at least partially cures at least the surface of the composition to form a non-tacky skin out of the polymer network;
wherein applying comprises at least one of spraying, brushing, or coating.

2. The method of claim 1, wherein the solution further comprises a photosensitizer.

3. The method of claim 1, wherein the solution further comprises a solvent comprising at least one of an aliphatic or alicyclic hydrocarbon, an aromatic solvent, ether, ester, alcohol, ketone, sulfoxide, amide, or halogenated solvent.

4. The method of claim 1, wherein the light comprises at least one of ultraviolet A light or blue light.

5. The method of claim 1, wherein the first amine comprises at least one of a tertiary amine or a guanidine.

6. The method of claim 5, wherein the first amine comprises at least one of triethylamine, dimethylethanolamine, benzyldimethylamine, dimethylaniline, tribenzylamine, triphenylamine, tetramethylguanidine (TMG), 1,8-diazabicyclo[5.4.0]undec-7-ene (DBU), 1,5-diazabicyclo[4.3.0]non-5-ene (DBN), 1,4-diazabicyclo[2.2.2]octane (DABCO), diphenylguanidine (DPG), dimethylaminomethyl phenol, and tris(dimethylaminomethyl)phenol.

7. The method of claim 1, wherein the composition further comprises a catalytic amount of a second amine, which may be the same or different from the first amine.

8. The method of claim 7, wherein the first amine and the second amine are the same.

9. The method of claim 1, wherein the polythiol is monomeric.

10. The method of claim 1, wherein the polythiol is an oligomeric or polymeric polythioether.

11. The method of any claim 1, wherein the polythiol is an oligomeric or polymeric polysulfide.

12. The method of claim 1, wherein the composition further comprises at least one of an oxidizing agent or a filler.

13. The method of claim 1, wherein the polyepoxide is monomeric.

14. The method of claim 1, wherein the polyepoxide is an oligomeric or polymeric epoxy resin.

15. The method of claim 6, wherein the composition further comprises a catalytic amount of a second amine, which may be the same or different from the first amine.

16. The method of claim 15, wherein the first amine and the second amine are the same.

17. The method of claim 6, wherein the polythiol is an oligomeric or polymeric polythioether.

18. The method of any claim 6, wherein the polythiol is an oligomeric or polymeric polysulfide.

19. The method of claim 6, wherein the polyepoxide is an oligomeric or polymeric epoxy resin.

20. The method of claim 7, wherein the second amine is a tertiary amine.

* * * * *